Jan. 20, 1970     F. E. COLGAN     3,490,561
POROUS DISC MIST CONDENSATION FITTING
Filed Oct. 19, 1967     2 Sheets-Sheet 1

INVENTOR.
FRANCIS E. COLGAN
BY
OSTROLENK, FABER, GERB & SOFFEN
ATTORNEYS

Jan. 20, 1970    F. E. COLGAN    3,490,561
POROUS DISC MIST CONDENSATION FITTING
Filed Oct. 19, 1967    2 Sheets-Sheet 2
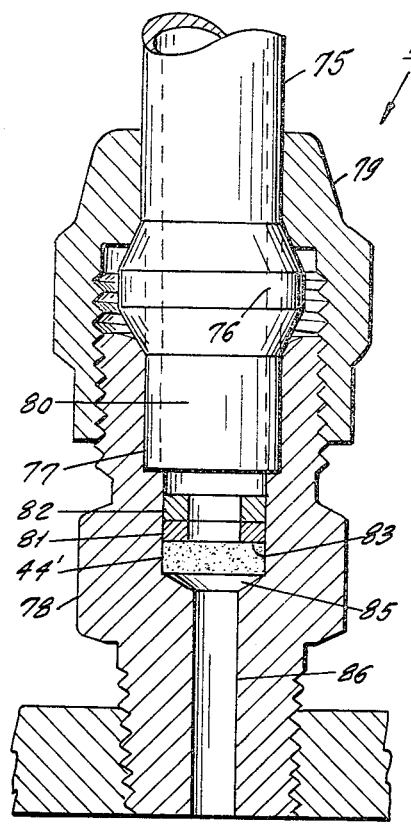
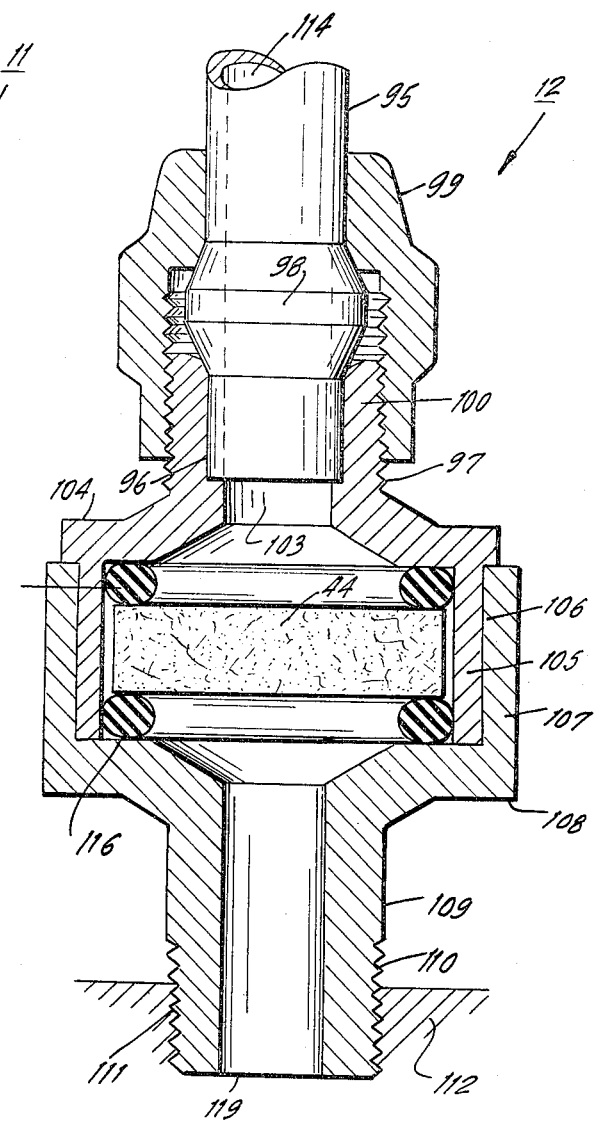
INVENTOR.
FRANCIS E. COLGAN
BY
OSTROLENK, FABER, GERB & SOFFEN
ATTORNEYS United States Patent Office 3,490,561
Patented Jan. 20, 1970

3,490,561
POROUS DISC MIST CONDENSATION FITTING
Francis E. Colgan, Midland Park, N.J., assignor to Auto Research Corporation, Boonton, N.J., a corporation of Delaware
Filed Oct. 19, 1967, Ser. No. 676,462
Int. Cl. F01m 1/06
U.S. Cl. 184—7    10 Claims

ABSTRACT OF THE DISCLOSURE

Lubricant in mist form is pumped through a number of conduits each leading to a meter unit which apportions the lubricant for its respective one of a plurality of bearings being lubricated; the mist lubricant is condensed into liquid form by a high restriction porous element in each meter unit, which element may be comprised of sintered, compressed particles of copper, stainless steel or other noncorrosive inert metals or materials; the sintered disc may be used with additional restriction means which apportions the volume of mist impinging on each porous element.

---

This invention relates to lubricating systems and more particularly to a lubricant mist condensation unit for such systems.

Complex machinery installations have a plurality of bearings and other points that must be lubricated. For reasons of economy, it is desirable to dispense or supply lubricant to these bearings and points from a single lubricant source. Lubricant is dispensed from a reservoir through a main conduit into branch conduits and through metering units which apportion the volume of lubricant going to each bearing or point.

In some machinery installations, lubricant must be supplied to certain bearings in mist form. However, not all bearings and points can make use of lubricant in mist form, the mist floating over and around some bearings without contacting, adhering to or lubricating them. At such bearings and points it is necessary that lubricant be provided in liquid form. The fitting of the present invention condenses the lubricant in mist form back to liquid form for lubricating those bearings and points requiring liquid lubricant.

In prior art lubricating systems, lubricant in mist form is condensed by providing a baffle plate in the path of the mist against which the mist strikes. The droplets of mist condense onto the baffle plate, and the liquid from the baffle plate flows onto the bearing or point. For bearings or points requiring a small volume of lubricant over a predetermined period, the mist passes through a conduit with a narrow passageway that can concentrate the mist in a thin stream. The mist exiting from the narrow conduit can readily be directed into contact with the baffle plate and little of it escapes without contacting the baffle plate. Thus, the mist condensation means is efficient with low volumes of mist per unit time.

However, for bearings or points requiring a large volume of lubricant over a predetermined period, the passageway through the conduit must be much wider. A great volume of mist exits from the conduit, and the mist cannot be concentrated, whereby much of its escapes or floats around the baffle plate instead of striking it. Thus, for large volumes of mist in a predetermined period, prior art mist condensation devices are very inefficient.

The mist condensation unit of the present invention is very efficient for condensing any volume per unit time of lubricant. The unit comprises a metering unit having a bore with a predetermined diameter opening therethrough for permitting a particular volume per unit of time of lubricant to pass to the bearing being lubricated. In the path of flow of the mist lubricant is positioned a porous element, which may be comprised of compressed particles of plastic or of porous ceramic material, but which is preferably comprised of a sintered metal disc, through which the lubricant mist is forced. The disc may be formed of particles of copper, stainless steel or other non-corrosive inert metals or materials. The sintered disc provides a multiplicity of tortuous pathways through which the mist passes. The droplets of lubricant are condensed out of the mist as they strike the sides of the tortuous pathways through the sintered disc. The now mist-free air continues out of the metering unit. The pressure of the continuing flow of mist-laden air through the sintered disc forces the now liquified lubricant out of the sintered disc through the metering unit and to the bearing or point to be lubricated.

Each metering unit apportions the amount of lubricant it delivers over a predetermined period. It does this by limiting the flow of air through itself by any of a number of known methods, including narrowing the diameter of the bore through which the lubricant mist passes, providing a pin in the bore through which the air passes to reduce the size of the bore or providing a spirally grooved insert for the bore, thereby providing a long spiral path through which the air travels.

Accordingly, it is an object of the present invention to provide a lubricant mist distributing unit for accurately apportioning lubricant mist among a plurality of bearings and points at different heights and different distances and from a central source of lubricant pressure and supply.

It is another object of the present invention to provide a lubricant mist distributing unit in which lubricant mist or finely divided suspended lubricant is condensed and supplied in liquid form to bearings to be lubricated. It is a further object of the present invention to provide such a unit which can be selectively designed to transmit any volume of lubricant mist, and which is highly efficient at all volumes per unit time of lubricant mist flow.

These and other objects of the present invention will become apparent after the following description is read in conjunction with the accompanying drawings in which:

FIGURE 3 is a longitudinal sectional view of a second embodiment of a flow metering unit.

FIGURE 4 is a longitudinal sectional view of a third embodiment of a flow metering unit.

Figure 1:
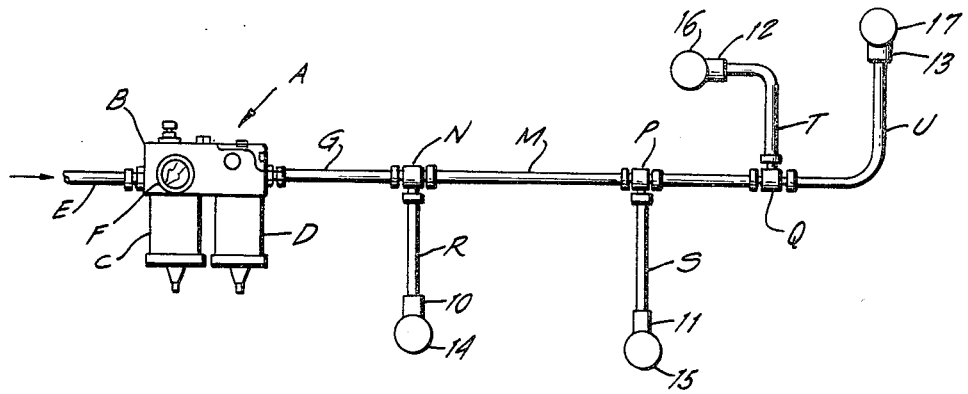
FIGURE 1 is a diagrammatic layout of a branch distribution lubricating system.

Referring to the drawings, and particularly to FIGURE 1, there is shown a source of lubricant mist such as that shown in U.S. Patent No. 3,086,616, issued Apr. 23, 1963, to Thomas R. Thomas, entitled "Lubrication System" and assigned to the assignee hereof. This source has a head B with an air receptacle C and a lubricant receptacle D depending therefrom. The air inlet E receives air under substantial pressure. Usual shop air pressure may be employed. The pressure gauge F indicates the pressure of the air. Outlet G receives the mist which is generated in the device A.

The lubricant mist generated flows into the main conduit or line M and through junctions N, P and Q to the branch conduits R, S, T and U. The bearings to be lubricated are indicated at 14, 15, 16 and 17. The metering units designed in accordance with the invention are indicated at 10, 11, 12 and 13. These units apportion the volume of air, and thereby the volume of lubricant that passes through the unit to its respective bearing. Certain of the units also contain a lubricant mist condensation fitting.

Figure 2:
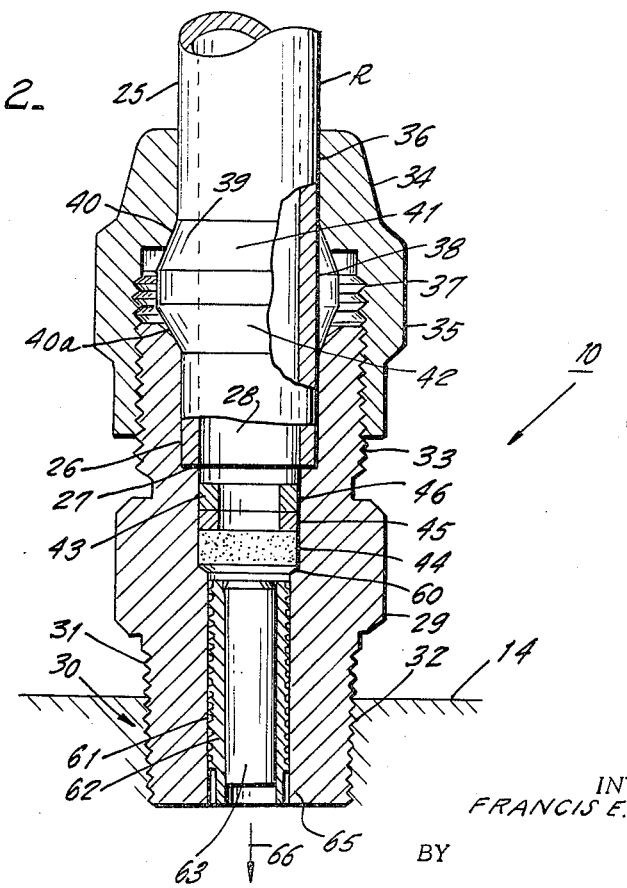
FIGURE 2 is a longitudinal sectional view of a first embodiment of a flow metering outlet unit.

In FIGURE 2 is shown a metering unit 10 designed in accordance with a first embodiment of the invention and having a bore extending therethrough. The metering unit 10 has an inlet conduit 25 positioned in the bore and comprised of the end of the branch tubing R. Tubing R may be comprised of brass, copper, nylon or other suitable noncorrosive lubricant carrying material. The tubing portion 26 forms an inlet chamber 28 in the central part of the fitting. The body of the metering unit at 29 is of hexagonal shape to facilitate its being rotated, and the outlet end of the unit 30 is provided with a pipe thread 31 to screw into a pipe threaded opening 32 in the bearing structure 14.

The inlet end of the unit is provided with a conventional compression fitting formed from a machine thread 33 which receives the coupling nut 34 having a hexagonal portion 35. Conduit 25 passes through opening 36 in the end of coupling nut 34. The thread 37 of the coupling nut is screwed onto the thread 33. A double tapered sleeve 39 having end tapers 41 and 42 is attached upon the portion 38 of the inlet conduit. As nut 34 is tightened, its annular tapered seating portion 40 presses on taper 41 and thereby presses taper 42 against its annular tapered seating portion 40a which creates a liquid tight seal.

The bore through the metering unit 10 is narrowed beneath conduit 25 to receive the fitting 44, which is held inside the cavity 43 and clamped down by the peripheral annular elements 45 and 46. The fitting 44 is a disc preferably comprised of sintered metal particles, such as copper, bronze, stainless steel, or other noncorrosive or inert metals or materials. It may also be formed from particles of plastic or from a porous ceramic. The sintered disc, or any other material chosen for forming the fitting 44 must have the quality of being porous in nature providing a plurality of tortuous paths through the disc, through which paths the lubricant mist laden air must travel to pass through the disc. The many bends in the path traveled by the mist laden air causes the lubricant particles to strike the walls of the paths and causes condensation into liquid form of the mist lubricant. The air continues through the disc and out the meter unit.

The sintered metal disc 44 may be formed of a disc of porous bronze, for example, about .060″ in thickness and about .176″ in diameter. The pores in the disc should have passageways of a diameter of from 10 to 150 microns.

Below disc 44 is the beveled shoulder 60, which leads to a still narrower chamber 61 which is obstructed by spiral restriction 62. A typical spiral restriction is shown in U.S. Patent No. 2,992,659, issued on July 18, 1961, to Thomas R. Thomas, entitled "High Restriction Metering Unit" and assigned to the assignee hereof. The plug 63 will expand the spiral restriction into tight contact with the wall of chamber 61. The lubricant is released from the end of this restricted passage through the annular chamber 65 formed in chamber 61 by the narrowing of the diameter of restriction 62.

The spiral restriction limits the diameter of the passageway through which is passed the air which previously carried the mist. The narrower and longer the spiral passageway, the greater is the resistance to the flow of the air, which thereby reduces the volume of mist laden air and, hence of lubricant that enters and passes through the particular metering unit 10 in a given period. While the spiral restriction 62 is shown downstream of the sintered disc 44, since the purpose of this spiral restriction is to restrict the flow of air through the metering unit, and since the spiral restriction, which provides a smooth passageway, would not cause condensation of the mist out of the air in which it is suspended, the spiral restriction may be upstream of the sintered disc within the contemplation of the invention.

Other lubricant flow volume restriction devices well known in the art may be used. For instance, the diameter of the conduit leading to or of the conduit leading from the sintered disc might be greatly reduced which would decrease the volume over a given period, respectively, of mist laden air that could pass to the disc 44 or mist free air that could leave the disc; or the conduit leading to or from the disc 44 might have a pin therein, which pin reduces the available space through which air might pass.

In this connection refer to the second embodiment of meter unit 11 shown in FIGURE 3. The tubing 75 is held by the double tapered sleeve 76 inside of the coupling nut 79 with a conventional compression fitting, such as that described above. The end 80 of the tubing 75 sits in the chamber 77. Beyond the end of tubing 75 and positioned within portion 78 of the unit is the disc 44′ comprised of the same materials as disc 44 and held in position by the annular elements 81 and 82 which press down upon the periphery 83 of the sintered disc 44′. The beveled outlet port 85 receives the flow of lubricant which flows through the outlet bore 86.

The unit 11 of FIGURE 3 differs from unit 10 of FIGURE 2 in that the former uses no spiral restriction to limit the outflow of air from bore 86, but instead relies on the narrowness of the bore to reduce air outflow and lubricant volume per unit of time to the bearing.

In the third embodiment of meter unit 12 shown in FIGURE 4 there is a much wider diameter disc 44″ which is comprised of the same materials as disc 44. The inlet tube 95 has a central flow passageway 114, the end 96 of which extends toward the reduced diameter passageway 103. The inlet 100 of the unit 12 is threaded at 97 and receives the coupling nut 99 which clamps the double tapered sleeve 98, thereby forming a conventional compression fitting, such as that described above. The unit 12 has an upper body portion 104 which has a reduced diameter nipple 105 that is press-fitted at the opening 106 into the cup 107 of the lower unit 108. The disc 44″ is clamped between the O-rings 115 and 116, which are flattened when the nipple 105 is squeezed securely into cup 107.

Projecting downwardly from the unit 108 is extension 109, which is threaded at 110 and screwed into the threaded recess 111 in the bearing structure 112. The central passage 119 receives the liquid lubricant from the disc 44″ and conducts it to the bearing. Note that passageway 119 is of greater diameter than both passageway 86 of FIGURE 3 and annular chamber 65 of FIGURE 2. Thus, a higher volume of lubricant mist per unit time can pass through unit 12 than through either of units 10 or 11.

The greater diameter disc 44″ is used with a metering unit through which a greater volume of mist laden air is to be passed. The wider the disc diameter, the more air can get through in any period of time. Where the disc of too small diameter for the volume of mist laden air passing through it, the pores in the disc would not be able to take in all the lubricant mist contacting them in a given period, and the disc would decrease the flow of lubricant mist and thus of lubricant that passes through the meter unit. Thus, the disc diameter cooperates with the predetermined diameter of the bore or with the other restricting means, such as the spiral restriction or the pin in bore restriction, to determine the volume of air and hence the volume of lubricant that passes through the meter unit to the bearing being lubricated over a period of time. The diameters of the porous disc, and of the bore conducting mist laden and mist free air, can be adjusted with respect to each other so that the proper volume of lubricant reaches each bearing and so that all mist lubricant entering a unit can be condensed. Unlike prior art condensation devices, no lubricant mist can escape being condensed. Thus, condensation units of all sizes designed in accordance with the invention are of very high efficiency.

While the invention has been illustrated using a single porous element or sintered disc, it is to be understood that a plurality of sintered discs or porous elements might be set up in tandem with the mist bearing air passing from one to the next sintered element.

The metering unit or fitting may be positioned directly on the bearing or might be somewhat remote therefrom and connected thereto by conduits or tail pipes.

As indicated above, the sintered discs might be used in combination with flow restricting elements such as a narrowed bore, a pin in the bore, or a spiral restriction. This type of metering system will assure proper apportionment of lubricant among a plurality of bearings served by a centralized lubricant installation and pump.

Although there has been described a preferred embodiment of this novel invention, many variations and modifications will now be apparent to those skilled in the art.

The embodiments of the invention in which an exclusive privilege or property is claimed are defined as follows:

1. In a lubricant distributing system wherein a lubricant mist is distributed to at least one point by a central lubricant mist distributing means,
   a central lubricant mist distributing means;
   a metering unit; said lubricant mist distributing means being connected with said metering unit; said metering unit having a bore therethrough for conducting lubricant mist therein and therethrough and for conducting condensed lubricant thereout;
   the improvement comprising,
   a flow restriction means in said bore to control the flow rate of mist travelling through said meter unit; said flow restriction means including a section of said bore having a predetermined narrowed width and a predetermined length, both chosen so as to control the flow rate of mist;
   a porous element in said unit positioned in the path of flow of lubricant mist through said unit; said porous element being constructed to provide a plurality of tortuous paths for said lubricant mist to pass through, whereby the lubricant is condensed into liquid form by its passage through said porous element; said porous element being positioned in said metering unit bore so as to be downstream of said flow restriction means.

2. In the lubricant distributing system of claim 1, the improvement further comprising said porous element being formed of a sintered metal disc.

3. In a lubricant distributing system, the improvement comprising said system having a plurality of metering units of claim 2;
   conduits connecting each of said units with said lubricant distributing means.

4. In the lubricant distributing system of claim 1, the improvement further comprising,
said flow restriction means comprising a spiral bore through which the mist passes and which restricts the flow of mist.

5. In a metering unit for use in a lubricant distributing system; said unit apportioning the volume of lubricant to be passed to a point over a predetermined period and condensing lubricant in mist form into liquid form; said metering unit comprising an inlet; an outlet and a bore joining these;
   the improvement comprising,
   a flow restriction means in said bore to control the flow rate of mist travelling through said meter unit; said flow restriction means including a section of said bore having a predetermined narrowed width and a predetermined length, both chosen so as to control the flow rate of mist;
   said bore having therein positioned a porous element constructed so as to provide a plurality of tortuous paths for lubricant mist bearing air passing through said bore from said inlet, whereby the lubricant in the mist will be condensed out of the mist into liquid form by its passage through said porous element; said porous element being positioned in said metering unit bore so as to be downstream of said flow restriction means.

6. In the metering unit of claim 5, the improvement further comprising, said porous element being formed of a sintered metal disc.

7. The lubricant distributing system of claim 1, the improvement further comprising, said porous element comprising a single integral unit.

8. The metering unit of claim 6 wherein said sintered disc is comprised of a single integral unit.

9. The metering unit of claim 8, wherein the length of said porous element in the bore of said meter unit is less than the width of said porous element.

10. In the metering unit of claim 5, the improvement further comprising,
    said flow restriction means comprising a spiral bore through which the mist passes and which restricts the flow of mist.

References Cited

UNITED STATES PATENTS

| | | | |
|---|---|---|---|
| 1,732,579 | 10/1929 | Gleason | 184—7 |
| 1,734,026 | 10/1929 | Bijur | 138—42 |
| 1,955,400 | 4/1934 | Zerk | 184—7 |
| 2,840,185 | 6/1958 | Norgren. | |
| 2,992,659 | 7/1961 | Thomas | 138—42 |
| 3,080,016 | 3/1963 | Thomas | 184—7 |
| 3,163,258 | 12/1964 | Thomas | 184—7 |

FRED C. MATTERN, JR., Primary Examiner

MANUEL ANTONAKAS, Assistant Examiner

U.S. Cl. X.R.

138—42